April 8, 1958　　　　J. M. MORRIS　　　　2,829,881
VIBRATORY SPRING OF EMBEDDED FILAMENTS
Filed Feb. 13, 1957
2 Sheets-Sheet 1
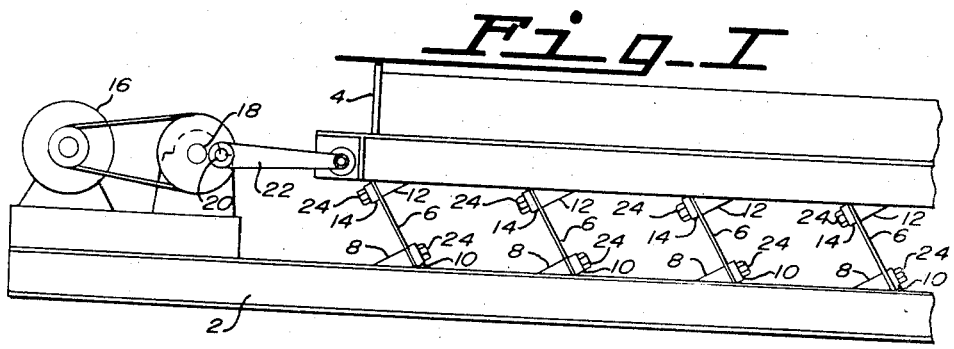
Fig. I
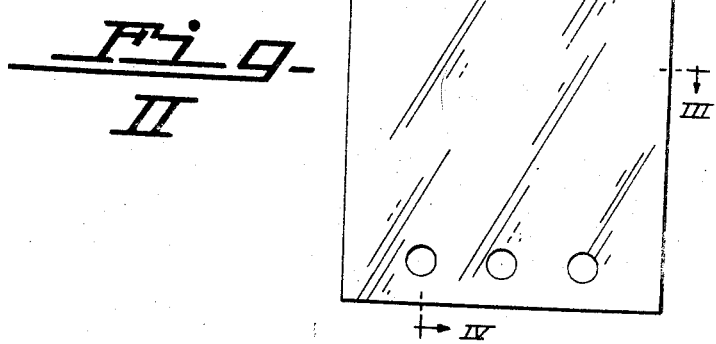
Fig. II
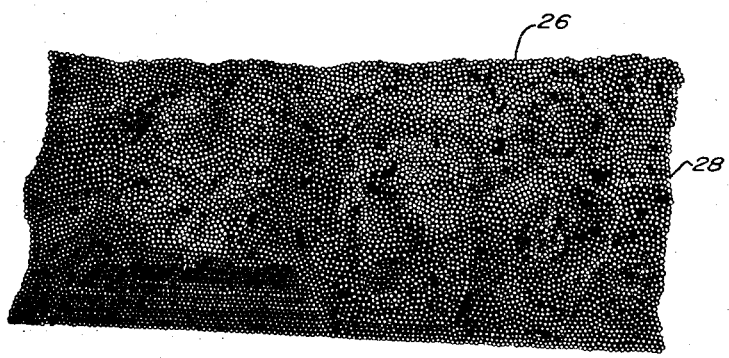
Fig. III
INVENTOR.
JOHN M. MORRIS
BY
Marshall, Marshall & Geasting
ATTORNEYS

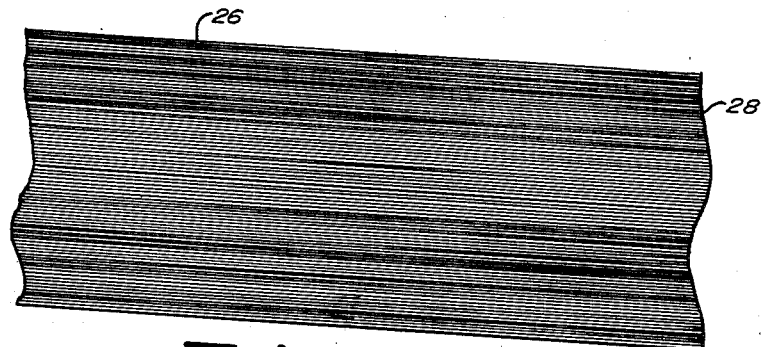
Fig. IV
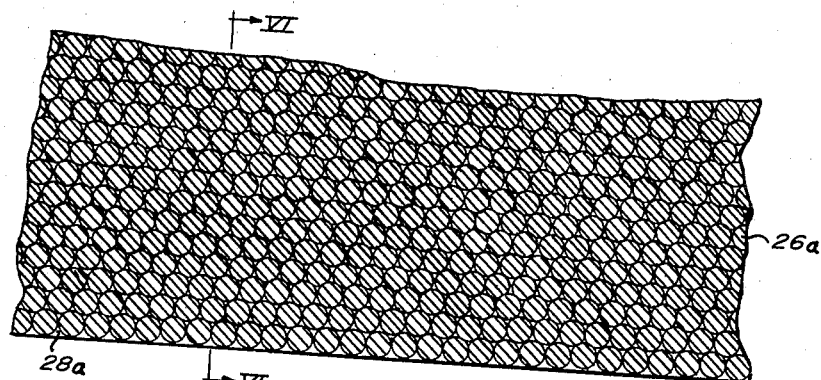
Fig. V
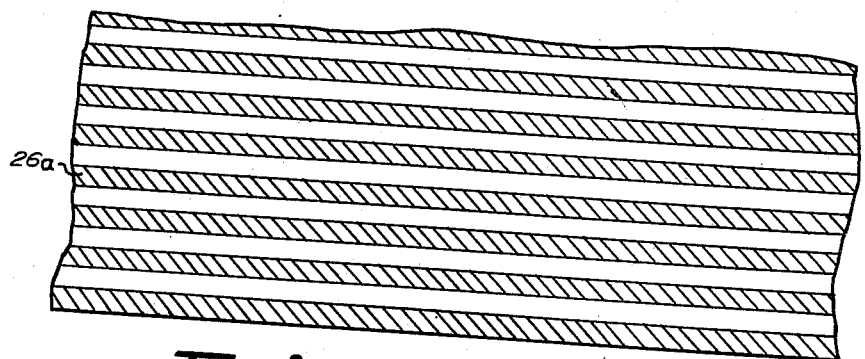
Fig. VI
INVENTOR.
JOHN M. MORRIS
BY
ATTORNEYS : 2,829,881
Patented Apr. 8, 1958

2,829,881

VIBRATORY SPRING OF EMBEDDED FILAMENTS

John M. Morris, Louisville, Ky., assignor to Carrier Conveyor Corporation, Louisville, Ky., a corporation of Kentucky Application February 13, 1957, Serial No. 640,024

11 Claims. (Cl. 267—1)

Many types of modern industrial machines such as conveyors, shake-down devices, compactors, homogenizers, hammers, drills and so forth function by intense vibration. Such machines often incorporate resilient elements such as springs, the vibratory capacity and endurance of which impose limits not only upon the length of time that the machines can be operated without shut-down for repairs but also upon the vibration amplitudes and frequencies at which the machines can be operated.

Constructions and materials the useful lives of which would last for years in environments where they were stressed at irregular intervals or at low frequencies may fail within a few days or within a few hours under intense vibration, even though they are never stressed beyond their "elastic limits."

Eshbach, "Handbook of Engineering Fundamentals," says: "Formerly it was supposed that vibration caused a change in the structure of metals, making the fibrous material crystalline and brittle. Thus the term 'fatigue of metals' came to be applied to this phenomenon. * * * As stresses are repeated, a tiny crack, sometimes called a fatigue crack, is formed and progresses until failure occurs. This action is referred to as a 'progressive failure.'" Failure under intense vibration results from so-called "fatigue rupture" rather than from excess distortion. "Machinery's Encyclopedia" states that so-called fatigue rupture occurs in parts which are subjected to continually repeated stresses of small magnitude, and that such parts can not be satisfactorily designed (nor can satisfactory materials be chosen) from a mere knowledge of behavior under other conditions.

Designers of mechanisms which operate by intense vibration have sought with little success to postpone fatigue rupture by substituting relatively soft materials such as ductile metals, i. e. copper or aluminum, wood, rubber and even swatches of resin impregnated cloth, instead of steel; although steel, except for its liability to fatigue rupture, functions better in vibratory mechanism than such soft materials.

The use of soft materials in vibratory mechanism damps or deadens the vibration upon the sharpness of which most vibratory processing procedures depend for optimum efficacy. Soft materials are prone to deterioration by peening, water absorption, chemical reaction, relaxation of resiliency and other causes.

The problem confronting designers of mechanisms which function by intense vibration is to devise mechanism incorporating highly elastic, highly flexible springs of adequate strength which nevertheless are not liable to breakdown by fatigue rupture.

It is an object of this invention to provide mechanism which functions by intense vibration and which incorporates composite highly elastic, highly flexible springs of adequate strength which are immune to fatigue rupture.

It is a further object to provide such vibratory mechanism incorporating composite resilient elements which are not liable to fatigue rupture.

A further object is to provide vibratory mechanism incorporating composite elements which have the long sought combination of high elasticity, great flexibility and high resistance to fatigue rupture.

Other objects and numerous advantages of the invention will become apparent upon perusal of the following description illustrated by the accompanying drawings in which:

Fig. I is a somewhat schematic elevational view showing a vibratory conveyor incorporating composite highly elastic, highly flexible fatigue rupture resistant elements;

Fig. II is an elevational view showing one form of a composite highly elastic, highly flexible fatigue rupture resistant element;

Fig. III is a fragmentary cross sectional view on a greatly enlarged scale taken substantially as indicated by the arrow III in Fig. II;

Fig. IV is a fragmentary cross sectional view on a greatly enlarged scale taken substantially as indicated by the arrow IV in Fig. II;

Fig. V is a fragmentary cross sectional view similar to Fig. III but on a still more enlarged scale, showing another form of an element which may be employed in place of that illustrated in Fig. III; and Fig. VI is a fragmentary cross sectional view on the same scale as Fig. V taken substantially as indicated by the arrows VI—VI in Fig. V.

This specification and the accompanying drawings describe and illustrate preferred forms of the invention but are not intended to impose limitations upon its scope.

It is known that the tensile strength of a fine metal wire, measured in pounds per square inch of cross sectional area, is much greater than the tensile strength in p. s. i. of a coarser wire or rod of the same material. It is well known also that the tensile strength in p. s. i. of a fine filament of glass is greater than the tensile strength in p. s. i. of a rod of the same material, and that the same thing is true in respect of other homogeneous construction materials.

A fine wire or a filament of any homogeneous construction material can be bent around a curve of smaller radius without breaking than can a thicker rod or wire. Elements of this invention are composite structures which include fine wires or filaments, and the above mentioned characteristics of such fine wires or filaments are factors contributing to the superior performance and greater durability of resilient elements of this invention and mechanisms in which the resilient elements are incorporated.

Elements made of steel, glass and other elastic materials which have notches, nicks, surface cracks, scratches, corrosion pits or similar small surface imperfections are prone to failure because of extension of such small surface breaks whenever the elements are subjected to strains or shocks. This characteristic is known as "notch sensitiveness." The greater the thickness of a beam, plate, bar or rod of a given material the more disastrous the extension of a crack is liable to be. Fine wires and filaments appear to be much less notch sensitive than thicker elements of like materials, perhaps because the greater the thickness of an element such as a beam, a plate, a bar or a rod the greater the surface fiber stress created by bending or otherwise distorting the element and the more the liability of starting surface cracks.

Mechanisms to which this invention applies incorporate composite elements which consist of bundles of parallel highly elastic fine wires or filaments that are bound together by matrices of relatively soft material such as a ductile or malleable metal or a synthetic resin. The tensile strength and the elasticity of the matrix may be very low but it should be flexible.

The matrix serves to prevent independent individual flexure of the elastic filaments and to cause them to act like an integral column in resisting longitudinally acting compressive strains while they act like discrete high strength wires in resisting strains in tension and in recovering from flexure.

In the composite structure of the elements incorporated in vibratory mechanism to which this invention relates, breakage of a single wire or filament is of minimuscular significance. A crack or break in a wire or filament whether it results from notch sensitivity or from some other cause does not progress from filament to filament through the element but is isolated in the filament where it originated. The utilization of this characteristic in protecting the resilient element from progressive failure is a major feature of this invention.

The vibratory conveyor illustrated in Fig. I has a base 2, and a vibratory conveyor trough 4 supported on the base 2 by longitudinally spaced apart and obliquely disposed plate springs 6 whose lower ends are secured to the base 2 by means of brackets 8 and clamps 10 and whose upper ends are secured to the conveyor trough 4 by means of brackets 12 and clamps 14.

For simplicity of illustration means for effecting vibration of the conveyor trough is shown as consisting of a motor 16 which drives a shaft 18 carrying an eccentric 20 that is journaled in one end of a connecting rod 22, the other end of which is pivotally connected to one end of the conveyor trough 4. Vibratory impulses may be imparted to the conveyor trough by any equivalent means such as electromagnetic vibrators or an inertial vibrator, e. g. an eccentric fly-weight.

The springs as illustrated in the drawings are simply flat rectangular plates having bolt holes adjacent their ends for the passage of clamping bolts 24. The structure of the plates per se comprises a multiplicity of parallel fine wires or filaments 26 in a molded matrix 28. The wires or filaments should be highly elastic; they should be straight unless the spring as a whole is curved and they may even be under small tension. Adjacent fibers should not cross each other, though an occasional crossing of wires or filaments is insignificant. Cellular fibers such as cotton, linen or wood should not be used. Each wire or filament should be integral. Twisted or spun threads consisting of a plurality of fibers should not be used. Woven fabric should not be used even though the warp filaments which extend from end to end of the plate be stretched straight. Under intense vibration warp and woof filaments damage each other.

Each wire or filament should be less than one sixty-fourth of an inch in diameter and preferably should extend from end to end of the plate, though the use of shorter wires or filaments is within the scope of this invention. So long as the wires or filaments are uniform in cross section and have smooth surfaces the finer they are the better they function, though the fabrication of plates with wires or filaments having diameters smaller than .0001" may be rather expensive. Plates containing filaments ranging from .00025" to .00075" have proven to be technically and economically practicable.

The matrix may consist of moldable ductile or malleable metal, but for economy and ease of fabrication a matrix of synthetic resin is preferable. When steel wires are severally surrounded by either moldable metal or synthetic resin they are protected against corrosion, which in many industrial applications causes rapid deterioration of unprotected steel springs and which would be rapidly fatal to the life of steel springs having the great surface area of a bundle of naked fine wires.

Where the matrix consists of a synthetic resin a thermoplastic resin may be used under some circumstances but a thermosetting resin is generally preferable. The resin may be any of a large number of commercially available resins, particularly effective binders for glass filaments being polymerizable unsaturated polyesters, diallyl esters, and epoxy resins, the latter having the characteristic of especially good adhesion to glass.

The epoxy resins are polyethers with terminal epoxide groups, i. e.,

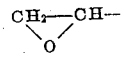

Most of the commercially available epoxy resins are reaction products of epichlorohydrin and bis-phenol. Examples showing the preparation of epichlorohydrin bis-phenol resins, which may be considered as basic epoxy resins, are disclosed in U. S. Patents Nos. 2,592,560 (April 15, 1952), 2,668,805 (February 9, 1954) and 2,668,807 (February 9, 1954) to S. O. Greenlee.

The terminal epoxide groups are the active groups through which cure by addition polymerization is accomplished. The curing process is based largely on the addition of an amino group to the epoxide group by opening the epoxide group to form an alcohol, as follows:

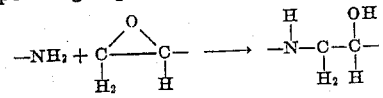

The amino group is added by means of complex amine hardeners which combine with the epoxy resins to form thermosetting resins. Other difunctional reactants can be employed, such as dibasic carboxylic anhydrides, isocyanates, as well as polyamides.

In a specific example, an epoxy resin suitable for impregnating parallel wires or filaments is made as follows: Epon 1001 (100 parts by weight), an epoxy resin sold by Shell Chemical Corp., is dissolved in a ketone. Dicyandiamide (4 parts by weight) is dissolved in a solution of boiling acetone and water (60 parts acetone and 40 parts water by weight). The epoxy resin solution is added to the dicyandiamide solution. Glass filaments are immersed in the resulting solution and dried to form laminating stock. A suitable loading on the glass filaments is 30 to 32% resin by weight. The procedure by which the straight parallel wires or filaments are embedded in the matrices is not a part of this invention. Procedures for embedding filaments in plastic are described in U. S. Patents Nos. 2,571,717, 2,684,318, 2,721,599, 2,721,820.

Sheets consisting of parallel glass filaments bonded together by synthetic resin as well as partially cured stacks made by laminating such sheets are available on the market. Such stacks are intended by their manufacturers to be molded into various articles such as pans, panels and blocks. Commercially available laminated stacks consisting of laminae containing parallel fine glass filaments bonded together by partially cured synthetic thermosetting resin can be pressed under heat and pressure into plates from which springs such as those illustrated in the drawings of this application can be cut.

In order to prevent displacement of the longitudinally extending parallel glass filaments during handling before compaction by hot pressing and while being compacted in a press, one or two laminae having the filaments extending crosswise can be added at the bottom and the top of the stack. The laterally extending filaments that are thus added to the resilient plate do not affect the functioning of the spring when it is subjected to intense vibration.

The wires or filaments of a spring such as illustrated and described herein should constitute a major part of the structure but no exact ratio of total cross sectional area of glass to cross sectional area of resin is critically necessary. The ratio of glass to resin may range from 50 glass:50 resin (or less) to 75 glass:25 resin (or more).

Springs fabricated as indicated above into plates 10½" long x 5½" wide x ¼" thick have been found to function excellently in a conveyor of the type illustrated in Fig. I and to be free of damage of fatigue rupture after approximately two hundred million cycles of intense vibration. They apparently will last for many years and through cycles of intense vibration numbered in billions. A small modicum of such violent and prolonged abuse would be destructive to any other resilient device known to the applicant. Examination of the spring described herein after incorporation in a vibratory conveyor and prolonged and violent vibration therein has shown the spring to have suffered no damage except some wear at the bolt holes.

Comparative quantitative tests made before and after such prolonged and violent vibration have shown the spring to have retained undiminished its pristine properties of tensile strength, elasticity in tension, flexural strength and recovery and compressive strength.

In the following Table A properties of springs made from steel and from commercially available composite plates are compared with properties of a spring of like size and shape constructed in accordance with this disclosure of parallel glass filaments in synthetic resin.

Table A

| Material Description | Ultimate Tensile Strength, p.s.i. | Max. Stress, p.s.i. | Modulus of Elasticity, p.s.i. | Modulus of Resilience (Energy storage capacity) in.-lb/cu.in. |
|---|---|---|---|---|
| Steel (Subject to atmospheric corrosion) | 50,000-300,000 | 15,000 | 30×10⁶ | 0.83 |
| Micarta #262 Phenolic-canvas | 12,000 | 3,300 | 1×10⁶ | 1.21 |
| Micarta #221 Phenolic-linen | 15,000 | 4,800 | 1×10⁶ | 2.56 |
| Pregwood #1116 Phenolic-wood | 25,000 | 9,650 | 2.5×10⁶ | 3.86 |
| Parallel glass filaments in synthetic resin | 120,000 | 16,500 | 4.5×10⁶ | 5.44 |

For long spring life the ratio of the modulus of elasticity to the ultimate strength should be as low as possible. A low ratio of modulus of elasticity to ultimate strength enables a spring to take large deflections comparatively safely and at the same time to support a great amount of weight at natural frequency vibration. The following Table B sets forth the ratios in respect of several materials.

Table B

Carbon steel $\dfrac{\text{Modulus}}{\text{Ultimate}} = \dfrac{30\times 10^6 \text{ p.s.i.}}{60,000 \text{ p.s.i.}} = 500$ Alloy steel $= \dfrac{30\times 10^6 \text{ p.s.i.}}{200,000 \text{ p.s.i.}} = 150$ Micarta $= \dfrac{1\times 10^6 \text{ p.s.i.}}{9,600 \text{ p.s.i.}} = 106$ Pregwood $= \dfrac{2.5\times 10^6 \text{ p.s.i.}}{26,000 \text{ p.s.i.}} = 96$ Glass filaments in resin $= \dfrac{5\times 10^6 \text{ p.s.i.}}{125,000 \text{ p.s.i.}} = 40$ In the form of composite spring structure illustrated in Figs. V and VI the filaments or wires 26a are of spring steel which is protected against corrosion by the matrix 28a of synthetic resin.

The quantitative data vary for glass and steel and resins of different formulae but the variation is not sufficient to affect the general comparison which shows the superiority of the parallel glass filament synthetic resin complex.

A vibratory conveyor of the type shown schematically in Fig. I moves granular commodities by tossing the granules forwardly at each vibration. The amplitude of vibration is a factor affecting the speed at which the commodity is conveyed; the farther the springs 6 bend at each cycle the greater the amplitude of vibration and the greater the speed at which the commodity moves for any given frequency of vibration. The extent to which a resilient steel plate can be bent depends upon its length and its thickness; the longer and thinner the plate the further it can be bent without subjecting the convexed and concaved surfaces to excessive fiber stress.

Because of the comparatively low ratio of modulus of elasticity to ultimate strength of the glass filament-resin matrix complex, short glass filament-resin matrix plates can function satisfactorily with vibratory amplitudes that would require much longer steel plates. The glass filament-resin matrix spring actually has greater capacity to cyclically store and apply energy than a solid steel spring of the same dimensions. This characteristic makes it feasible to lower the conveyor trough (an important consideration in many installations) because of the unique relation of properties of the materials utilized and the structural features of the springs to the intense vibratory environment in which the springs are required to function.

It is to be understood that the forms of the invention described in this specification and shown by the accompanying drawings are merely illustrative and that the invention encompasses other forms and variations within the spirit and scope of the subjoined claims.

I claim:

1. In a vibrating machine including a base and a vibratory work member movable with respect thereto, a cantilever leaf spring comprising a plurality of filaments extending substantially over the length of the spring wherein all filaments are substantially parallel and are embedded in a relatively soft matrix, and rigid couplings between said leaf spring and said base and member.

2. In a vibrating machine including a base and a vibratory work member movable with respect thereto, a cantilever leaf spring comprising a plurality of filaments extending substantially over the length of spring wherein all of said filaments are substantially parallel, a matrix of a material which is soft relative to the filament material embedding said filaments, said filaments occupying from ½ to ¾ of the cross-sectional area of said spring, and rigid couplings between said leaf spring and said base and member.

3. In a vibrating machine including a base and a vibratory work member movable with respect thereto, a cantilever leaf spring comprising a plurality of filaments extending substantially over the length of the spring wherein all of said filaments are substantially parallel, a matrix of a material which is soft relative to the filament material embedding said filaments, the diameter of said filaments being less than 1/64 of an inch, and rigid couplings between said leaf spring and said base and member.

4. In a vibrating machine including a base and a vibratory work member movable with respect thereto, a cantilever leaf spring comprising a plurality of glass filaments extending substantially over the length of the spring wherein all of said filaments are substantially parallel, a matrix of a material which is soft relative to glass embedding said filaments, and rigid couplings between said leaf spring and said base and member.

5. In a vibrating machine including a base and a vibratory work member movable with respect thereto, a cantilever leaf spring comprising a plurality of filaments extending substantially over the length of the spring wherein all of said filaments are substantially parallel, a matrix of a synthetic resin which is soft relative to the material of said filaments embedding said filaments, and rigid couplings between said leaf spring and base and member.

6. In a vibrating machine including a base and a vibratory work member movable with respect thereto, a planar, cantilever, leaf spring comprising a plurality of filaments extending substantially over the length of the spring wherein all of said filaments are substantially parallel, a matrix of a material which is soft relative to the filament material embedding said filaments, and rigid couplings between said leaf spring and said base and member.

7. In a vibrating machine including a base and a vibratory work member movable with respect thereto, a cantilever leaf spring comprising a plurality of glass filaments extending substantially over the length of the spring wherein all of said filaments are substantially parallel, a matrix of a synthetic resin which is relatively soft with respect to the glass of said filaments embedding said filaments, and rigid couplings between said leaf spring and said base and member.

8. In a vibrating machine including a base and a vibratory work member movable with respect thereto, a cantilever leaf spring comprising a plurality of glass filaments extending substantially over the length of the spring wherein all of said filaments are substantially parallel, a matrix of a synthetic resin which is relatively soft with respect to the glass of the filaments embedding said filaments, said filaments occupying from ½ to ¾ of the cross-sectional area of said leaf spring, and rigid couplings between said leaf spring and base and member.

9. In a vibrating machine including a base and a vibratory work member movable with respect thereto, a cantilever leaf spring comprising a plurality of glass filaments extending substantially over the length of the spring wherein all of said filaments are substantially parallel, a matrix of a synthetic resin which is soft relative to the glass of said filaments embedding said filaments, said filaments occupying from ½ to ¾ of the cross-sectional area of said leaf spring, and being less than $\frac{1}{64}$ of an inch in diameter, and rigid couplings between said leaf spring and said base and member.

10. A combination in accordance with claim 7 wherein said synthetic resin is an epoxy resin.

11. In a vibrating machine including a base and a vibratory work member movable with respect thereto, a planar, cantilever, leaf spring comprising a plurality of glass filaments extending substantially over the length of the spring wherein all of said filaments are substantially parallel, a matrix of a synthetic resin which is soft relative to the glass of said filaments embedding said filaments, said filaments having a diameter of less than $\frac{1}{64}$ of an inch, and rigid couplings between said leaf spring and base and member.

References Cited in the file of this patent
UNITED STATES PATENTS

| | | |
|---|---|---|
| 2,689,122 | Musikant | Sept. 14, 1954 |
| 2,689,464 | Wurtz | Sept. 21, 1954 |
| 2,769,741 | Schwartz | Nov. 6, 1956 |